J. N. WESTERBERG & D. OLSON.
RAKE.
APPLICATION FILED MAR. 11, 1912.
1,046,045.
Patented Dec. 3, 1912.
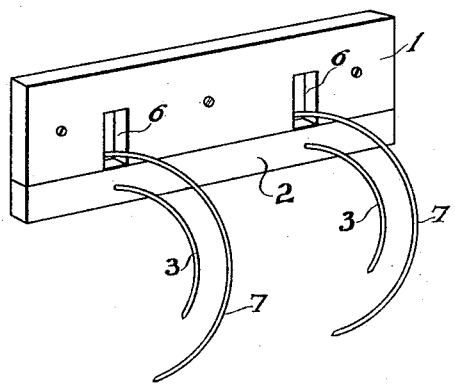
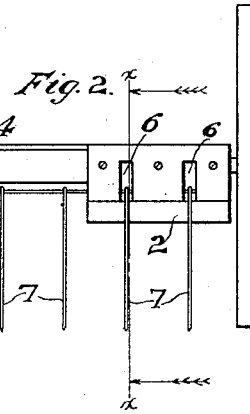
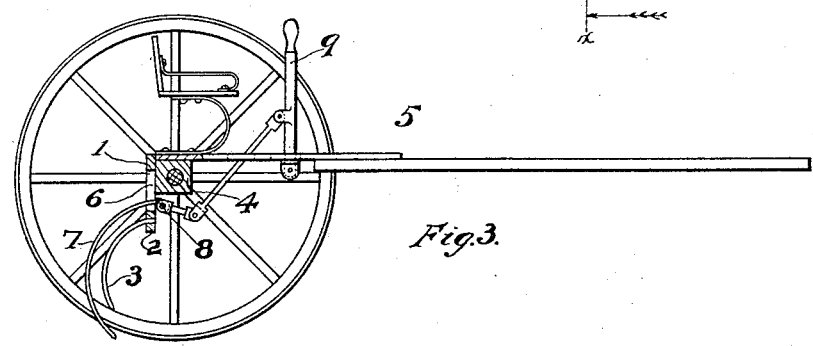
Witnesses
N. Brandt.
A. A. Olson.
Inventors
John N. Westerberg
and
David Olson.
By Joshua H. Potts
their Attorney.

UNITED STATES PATENT OFFICE.

JOHN N. WESTERBERG AND DAVID OLSON, OF BRIDGEPORT, KANSAS.

RAKE.

1,046,045.

Specification of Letters Patent.     Patented Dec. 3, 1912.

Application filed March 11, 1912.  Serial No. 682,996.

*To all whom it may concern:*

Be it known that we, JOHN N. WESTERBERG and DAVID OLSON, citizens of the United States, and residents of the city of Bridgeport, county of Saline, and State of Kansas, have invented certain new and useful Improvements in Rakes, of which the following is a specification.

Our invention relates to improvements in hay rakes, and has for its object the production of a hay rake which will be of improved construction and efficient in operation.

Other objects will appear hereinafter.

With these objects in view, our invention consists in the combinations and arrangements of parts hereinafter described and claimed.

Our invention will be more readily understood by reference to the accompanying drawings forming a part of this specification, and in which—

Figure 1 is a perspective view of an attachment for hay rakes embodying our invention, Fig. 2 is an end view of a hay rake equipped with attachments of the form shown in Fig. 1, and Fig. 3 is a section taken on substantially line $x$ $x$ of Fig. 2.

The preferred form of construction, as illustrated in the drawings, comprises an attachment which consists of a body or supporting member composed of sections 1 and 2 which are rigidly secured together, as by screws or other fastening devices. Secured at their upper ends in the section 2 is a plurality of depending curved teeth 3.

In use, an attachment of the construction just described is arranged at each extremity of the hay rake, the section 1 of each attachment being rigidly secured to any convenient portion of the framework 4 of the rake 5 so that the terminal teeth 7 of the rake will project through elongated slots 6 provided for the reception thereof in the member 1, said slots evidently permitting of free movement of the rake teeth which are pivotally secured, as at 8, at their upper extremities for upward swinging by a lever 9, when it is desired to release or drop the hay which has been gathered thereby. The base or holder member of the attachment is formed in two sections, as mentioned, in order to facilitate attachment, the section 1, during attachment, being first secured in position, whereupon the section 2 carrying the teeth 3 is secured in position upon the lower edge thereof. When the attachment is thus arranged, the teeth 3 will be disposed directly forward of and substantially parallel with the corresponding teeth 7, said teeth 3 being of such a length, that the lower ends thereof will be positioned above the lower ends of the teeth 7 or a considerable distance above the ground. With this arrangement, upon drawing of the rake over the ground, the hay which is gathered by the teeth 7 and which slides upwardly upon said teeth, as the hay accumulates, will move to position between the teeth 7 and 3, the hay being thus clamped in position between said teeth so that the same will not be permitted to be blown against the wheels of the rake to interfere with the operation thereof. The attachments are used only at the extremities of the rake, since the provision of supplemental teeth 3 for coöperation with the terminal rake teeth 7 will be sufficient to hold the hay, which is gathered by the rake, against shifting by reason of the wind or for any other reason. The supplemental teeth 3 will not in any way interfere with the operation of the rake, since, upon upward swinging of the teeth 7 to discharging or releasing position, the hay which has been wedged or forced into position between the teeth 3 and 7, will be free and will drop from engagement with said teeth 3 and be deposited upon the ground as desired.

The device may be in the form of an attachment, as described, for arrangement upon a hay rake already in use, or the supplemental teeth 3 may be installed in a hay rake simultaneously with the manufacture thereof. The provision of the teeth 3 in a rake will serve to effectually prevent the blowing of the hay gathered by the rake against the wheels of the latter, which at the present time is of great inconvenience and annoyance to the operator of a device of this character.

While we have illustrated and described the preferred form of construction for carrying our invention into effect, this is capable of variation and modification without departing from the spirit of the invention. We, therefore, do not wish to be limited to the exact details of construction set forth, but desire to avail ourselves of such variations and modifications as come within the scope of the appended claims.

Having described our invention, what we claim as new and desire to secure by Letters Patent, is:

1. The combination with a rake comprising a wheeled frame having a non-tilting portion and rake teeth tiltably mounted in said frame, of stationary supplemental teeth carried by said non-tilting frame portion and arranged forward of and substantially parallel with certain of said rake teeth, the points of said supplemental teeth being positioned at a higher level than the points of said rake teeth.

2. The combination with a rake comprising a wheeled frame having a non-tilting portion and rake teeth tiltably mounted in said frame, of stationary supplemental teeth supported by said non-tilting frame portion and arranged forward of and substantially parallel and coplanar with certain of said rake teeth, the lower ends of said supplemental teeth being positioned at a higher level than the points of said rake teeth.

3. The combination with a rake comprising a wheeled frame having a non-tilting portion and rake teeth tiltably mounted in said frame, of stationary supplemental teeth supported by said non-tilting frame portion and arranged forward of and substantially parallel and coplanar with the endmost of said rake teeth, the points of said supplemental teeth being positioned at a higher level than the points of said rake teeth.

4. The combination with a rake comprising a wheeled frame having a non-tilting portion and rake teeth swingingly mounted in said frame, of an attachment comprising a holder attached to said non-tilting portion of said frame, and teeth secured to and depending from said holder, said last mentioned teeth being positioned slightly forward of and substantially parallel with certain of said rake teeth, the points of said attachment teeth being positioned at a higher level than the points of said rake teeth.

In testimony whereof we have signed our names to this specification in the presence of two subscribing witnesses.

JOHN N. WESTERBERG.
DAVID OLSON.

Witnesses:
ROBT. OLSON,
C. F. BERGTRAN.

---

Copies of this patent may be obtained for five cents each, by addressing the "Commissioner of Patents, Washington, D. C."